United States Patent
Plüss

Patent Number: 5,281,369
Date of Patent: Jan. 25, 1994

[54] SUPPORTING GRATE FOR PACKINGS IN MATERIAL EXCHANGE COLUMNS

[75] Inventor: Raymond C. Plüss, Klein-Andelfingen, Switzerland

[73] Assignee: Sulzer Brotthers Limited, Winterthur, Switzerland

[21] Appl. No.: 893,637

[22] Filed: Jun. 5, 1992

[30] Foreign Application Priority Data

Jun. 7, 1991 [CH] Switzerland ............ 01698/91

[51] Int. Cl.⁵ ............................. B01F 3/04
[52] U.S. Cl. ............................. 261/97
[58] Field of Search ............... 261/97, 94

[56] References Cited

U.S. PATENT DOCUMENTS

| | | | |
|---|---|---|---|
| 3,222,040 | 12/1965 | Eckert | 261/94 |
| 3,259,380 | 7/1966 | Brown | 261/97 |
| 3,419,253 | 12/1968 | Eckert | 261/97 |
| 4,171,333 | 10/1979 | Moore | 261/94 |
| 4,267,978 | 5/1981 | Manteufel | 261/97 |
| 4,296,050 | 10/1981 | Meier | 261/112.2 |
| 5,000,883 | 3/1991 | Leva | 261/97 |
| 5,061,407 | 10/1991 | Nutter | 261/97 |

FOREIGN PATENT DOCUMENTS

| | | |
|---|---|---|
| 0257152 | 3/1988 | European Pat. Off. |
| 2911869 | 10/1979 | Fed. Rep. of Germany |
| 0598617 | 3/1978 | U.S.S.R. ............ 261/97 |

*Primary Examiner*—Tim Miles
*Attorney, Agent, or Firm*—Townsend and Townsend Khourie and Crew

[57] ABSTRACT

The supporting grate for material exchange columns has a corrugated profile (3) and gas openings (5) which are all arranged in the flanks (6) of the profile above a minimum height H1. A projecting edge (13) of the gas openings increases the strength of the profile and forces the fluid to run off into the corrugation trough of the profile and from there into a collecting trough (12) lying below it. In this way the supporting grate also acts as a fluid collector.

11 Claims, 5 Drawing Sheets

SUPPORTING GRATE FOR PACKINGS IN MATERIAL EXCHANGE COLUMNS

BACKGROUND OF THE INVENTION

The invention relates to a supporting grate for packings in material exchange columns with a corrugated profile and gas openings. Packings of material exchange columns are held by supporting grates, mostly in the form of bar grates. For this, ordered packings for example according to DE-PS 27 22 424 or also so-called loose packings, for example Pall rings, are used. Material exchange columns are often divided into sections, so that the fluid is collected and redistributed and thus a new uniform fluid distribution over the cross-section is achieved and concentration profiles over the cross-section are broken down. Inlets and lateral outlets can also be attached at such locations. Before the fluid dripping down is redistributed on a material exchange section lying below it this fluid must be collected and if necessary combined and mixed with an inlet stream delivered from outside. This necessitates a relatively costly collecting device, consisting for example of a collecting base with steam chimneys and a fluid outlet by means of which the collected fluid is delivered to a fluid distributor lying below it. The collector can also consist of a plurality of collecting plates covering the entire column cross-section. If no intermixing of the fluid is necessary, the fluid can also drip through from the collecting base directly onto the lower exchange section. A collecting base must then be perforated over the entire cross-section. However, this does not produce sufficient intermixing of the fluid which could equalise concentration gradients over the cross-section.

Humped grates with a corrugated profile and gas openings can also be used as supporting grates, these humped grates consisting for example of a profiled sheet with slots, holes or of metal mesh. The advantage of this corrugated profiling lies in the enlargement of the surface by comparison with a flat arrangement, so that a greater cross-section is provided for the steam or gas to pass through and thus a reduced pressure drop is achieved. In addition the humped shape increases the rigidity and breaking strength of a grate.

However, these known arrangements have considerable disadvantages. Large overall heights are necessary and in spite of the increased surface area due to the corrugation there is still a disturbingly high pressure loss. In addition, with larger column diameters the supporting capacity of the perforated supporting grates is often insufficient, so that for example one single bearing ring on the column casing is not enough but rather additional supports have to be mounted, which in turn requires additional column height. Furthermore, the known constructions are also costly to produce.

SUMMARY OF THE INVENTION

It is therefore the object of the invention to overcome these disadvantages and to create a simpler supporting grate which is space-saving and stable, with low pressure loss for the gas phase and with a reduced tendency to flooding, which also fulfils the additional function of a fluid collector.

This object is achieved according to the invention by a supporting grate for packings in material exchange columns having a corrugated profile and gas openings. The gas openings are arranged in the flanks of the profile and above a minimum height $H1$ the domes of the profile are closed. At least one drain hole or a lateral outlet is provided in each corrugation trough base of the profile above a collecting trough which lies below it. The gas openings have a projecting edge which is raised towards the fluid side. The particular advantages of the solution according to the invention reside in the fact that with the novel supporting grate structure not only improved mechanical and material exchange properties but also a substantial expansion of its functions are achieved in a simple manner. Because no gas openings are arranged in the lower region of the profile up to the minimum height $H1$, this region forms a fluid collector. On the other hand the projecting edge forces the fluid which is streaming down to flow around the gas openings. The closed profile domes and the increased blast action of the gas at the openings caused by the edge in turn prevent any possible raining down. In addition, by the construction of the gas openings with a raised edge the pressure drop is reduced and at the same time the rigidity and bearing strength of the grate is increased.

Particularly good flow conditions and a low pressure drop can be achieved by rounded bending upwards of the gas openings (Venturi effect). Advantageous dimensions of the gas openings and the edges could have the following ratios: a ratio of radius of curvature $R$ of the bending up of the edge in relation to the horizontal diameter $D$ of preferably 0.2 to 1 produces favourable flow conditions. A ratio of edge height $H3$ to diameter $D$ of preferably 0.2 to 1 produces a reliable diversion of the fluid around the openings, while a ratio of the free through-flow width $D1$ between adjacent gas openings to the diameter $D$ of preferably 0.4 to 1 produces the necessary space for reliable draining of the fluid in this region. This free through-flow width $D1$ can be greater in the lower region of the profile flanks than in the upper region, corresponding to the quantity of fluid which increases towards the bottom. A suitably large collecting channel in the lower part of the profile is achieved by a ratio of minimum height $H1$ to profile height $H$ of preferably 0.2 to 0.5 and in that the trough base forms the lowest part of the profile. Good utilisation of the column cross-section with favourable gas and fluid guiding properties can further be achieved by a profile design in which the profile domes $A$ in relation to the corrugation length $P$ lie preferably between 0.1 and 0.3 and by profile flank angles of preferably 5° to 15°. Economical profiles which are simple to produce can be made from sheet material with flanged edges or from ceramic with superimposed edges. For adaptation to any column diameter, supporting grates according to the invention can be produced rationally and thus economically by assembling the profile in modular form from parts. For example, profiles can be assembled from individual corrugations or pairs of corrugations or flanks and profile domes can each be assembled separately as well as the corrugation trough as collecting channel. A supporting grate includes one or a few collecting troughs running obliquely with respect to the corrugation troughs and drain holes lying above them. A further simple profile can also have in each case a lateral overflow into an annular channel lying below it as a collecting trough on the column wall. This annular channel then serves simultaneously as a mounting for the grate.

BRIEF DESCRIPTION OF THE DRAWINGS

FIGS. 7a, 7b show a variant of the supporting grate composed of two humped profiles with a collecting channel fixed on at the bottom as a profile corrugation through;

Figure 1:
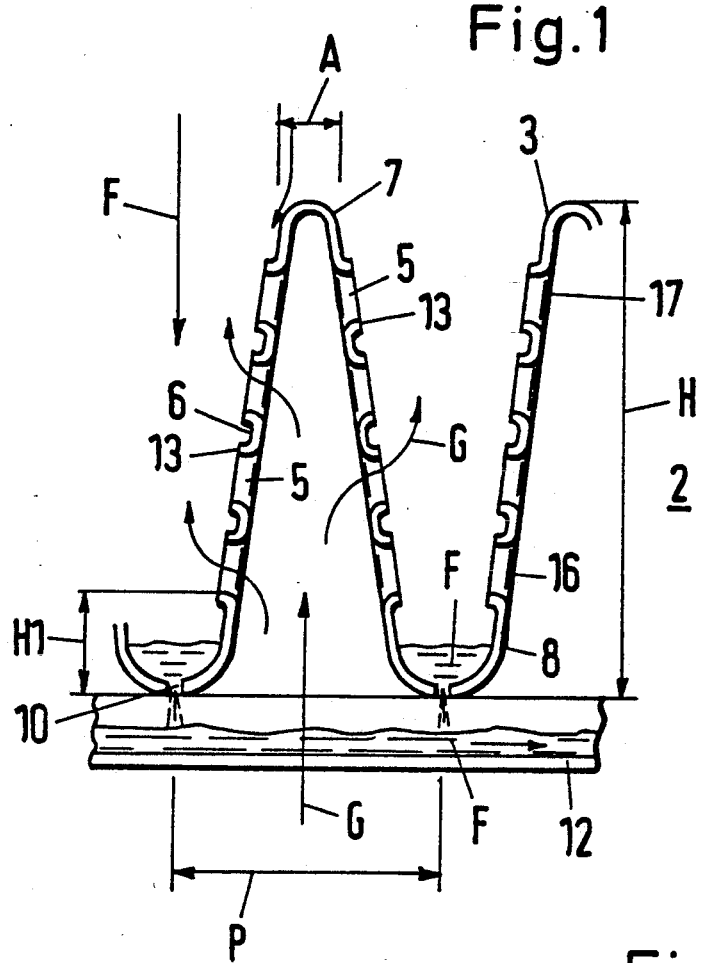
FIG. 1 shows a representation of the principles of a supporting grate with central drain holes according to the invention.

The basic representation of a supporting grate 2 according to the invention in FIG. 1 shows a corrugated profile 3 of height h and corrugation length P, for example bent from sheet material, with a relatively narrow dome 7, relatively steep flanks 6 and a corrugation trough base 8 which is wider than or at least as wide as the dome 7 with a width A. The bottom of the corrugation through 8 and the domes 7 have no gas openings 5. These are all provided in the flanks 6 above a minimum height H1. A drain hole 10 for the collected fluid F is let in at the lowest point in the corrugation through 8. The fluid then falls into a collecting through 12 which is arranged immediately below this and runs at right angles to the corrugations. See FIG. 6. The gas holes 5 have a projecting edge 13 which is raised towards the fluid side (F) and which favours the gas flow G and also strengthens and reinforces the profile 3.

Figure 2:
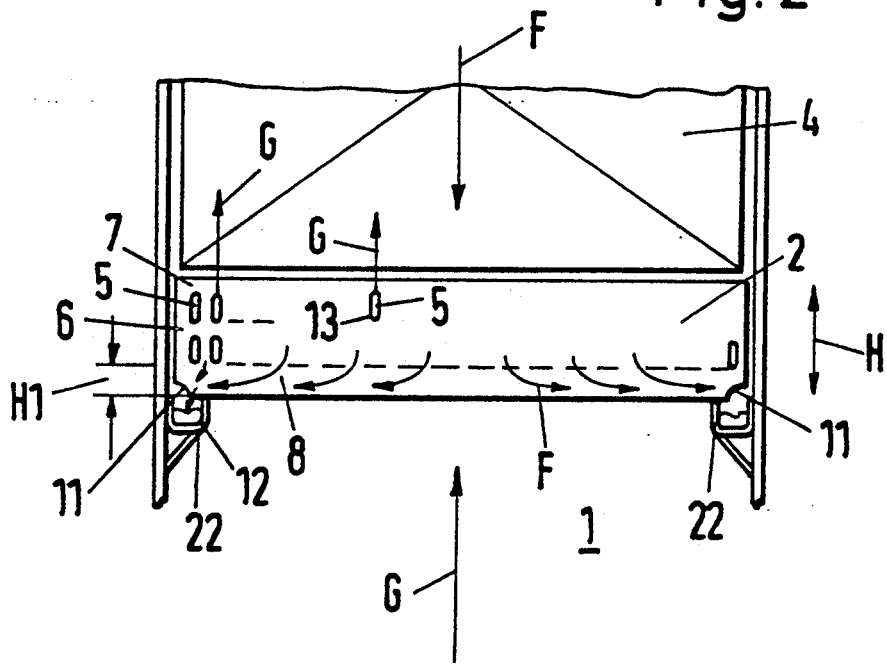
FIG. 2 shows an arrangement of a supporting grate with lateral drains and an annular channel in a material exchange column.

An arrangement of a supporting grate 2 according to the invention is shown in FIG. 2 in cross-section in a material exchange column 1. The corrugation profile 3 here supports an ordered packing 4. The bottom of the corrugation trough 8 has at each end a lateral outlet 11 which serves as a drain and which feeds the fluid F into an annular channel 22 as collecting trough 12. See FIG. 2. The annular channel 22 is also simultaneously constructed as a mounting and support for the supporting grate 2.

Figure 3A:
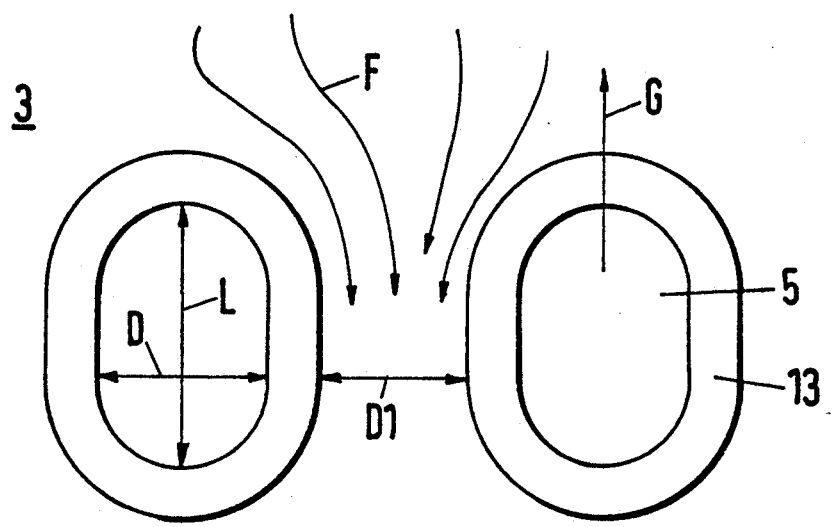
FIGS. 3a, 3b show an arrangement of gas openings with edges bent upwards and their flow conditions.
Figure 3B:
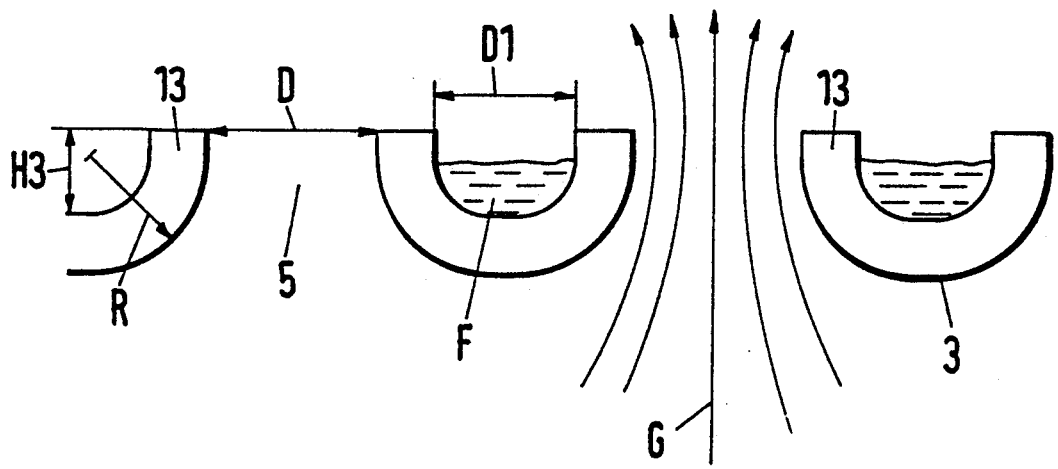

FIGS. 3a, 3b show gas openings 5 in two views with their edges 13 rounded and bent upwards and projecting towards the fluid side. These edges 13 with a height H3 cause the fluid F to flow around the openings 5 with a horizontal diameter D. In this case the fluid must run off over the free through-flow width D1 between adjacent openings 5. Corresponding to the quantities being drained off which increase towards the bottom, the free through-flow width D1 can be chosen so that it is greater in the lower region 16 of the flanks 6 than in the upper region 17 (FIG. 1). The rounding of the openings 5 with a radius of curvature R causes particularly favourable flow conditions here for the gas G, and due to the Venturi effect the gas flows with very low pressure loss through the openings 5 and because of the high speed also prevents any fluid from raining through. Favourable ratios of the dimensions R, D, D1, H3 and H to achieve the advantageous synergistic effects which have been explained are set out in the dependent claims. The length L of the openings 5 preferably amounts usually to one to three times the horizontal diameter D. Such profile shapes can be simply produced for example from sheet material with edges flanged upwards.

Figure 4:
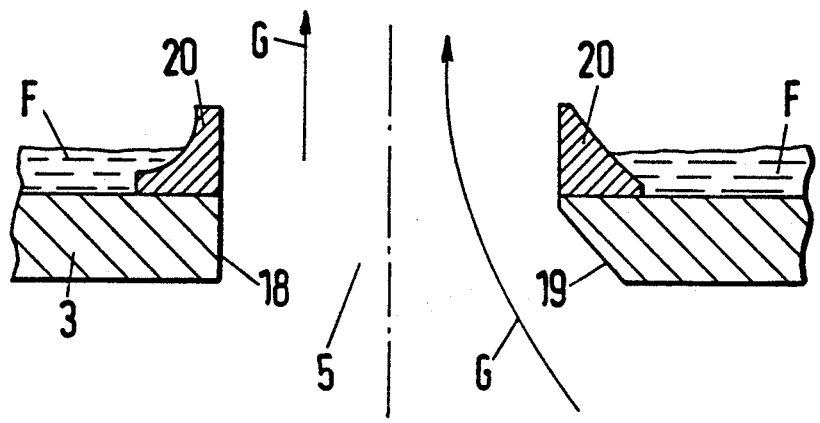
FIG. 4 shows an example of gas openings with superimposed edge in ceramic.

FIG. 4 shows an embodiment in ceramic with superimposed edges. In this case the gas openings 5 can also have a quite simple straight edge 18 or a boundary with inner chamfering 19 which markedly improves the gas flow G.

Figure 5:
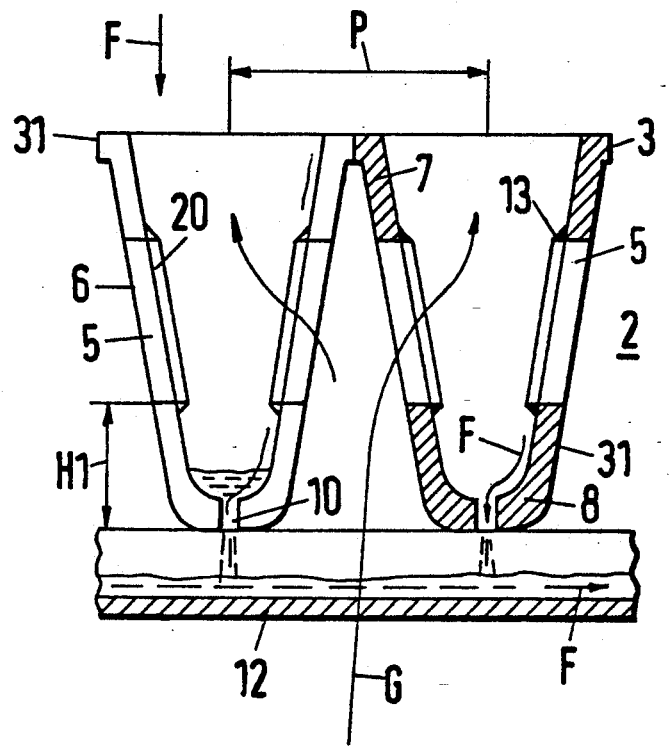
FIG. 5 shows corrugated individual profiles in ceramic.
Figure 6:
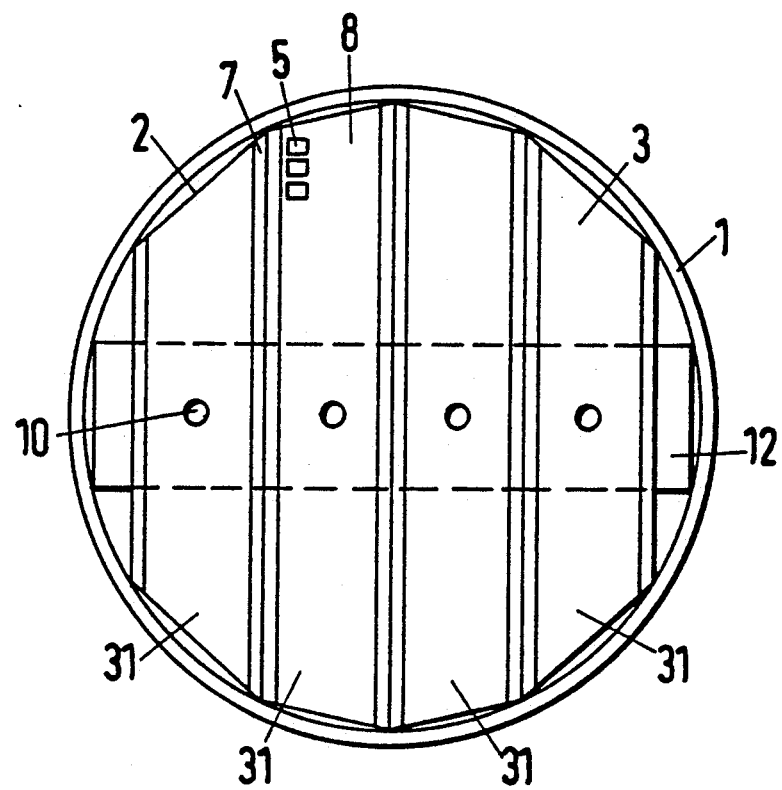
FIG. 6 shows a column cross-section with supporting grate and a collecting trough lying below it and running at right angles to the corrugations.

FIG. 5 shows as a further example of a supporting grate made from ceramic two individual profiles 31 with a superimposed edge 13 which can be assembled simply and rationally to form a desired column size, as shown in FIG. 6. Four individual elements 31 are arranged here over the cross-section of a column 1. A collecting trough 12 runs at right angles to the elements 31 with in each case a central drain hole 10 to feed the fluid into the collecting trough 12. This trough 12 can serve as pre-distributor for a trough distributor, thus saving the structural height and costs of a separate collector.

Figure 7A:
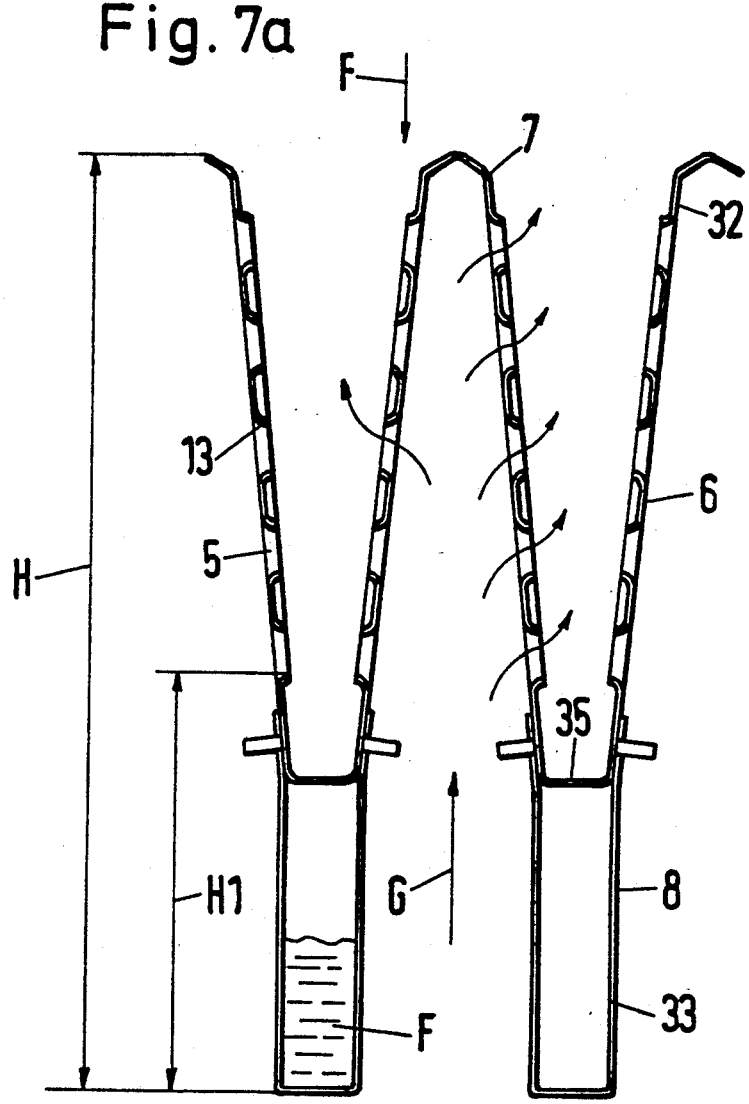
Figure 7B:
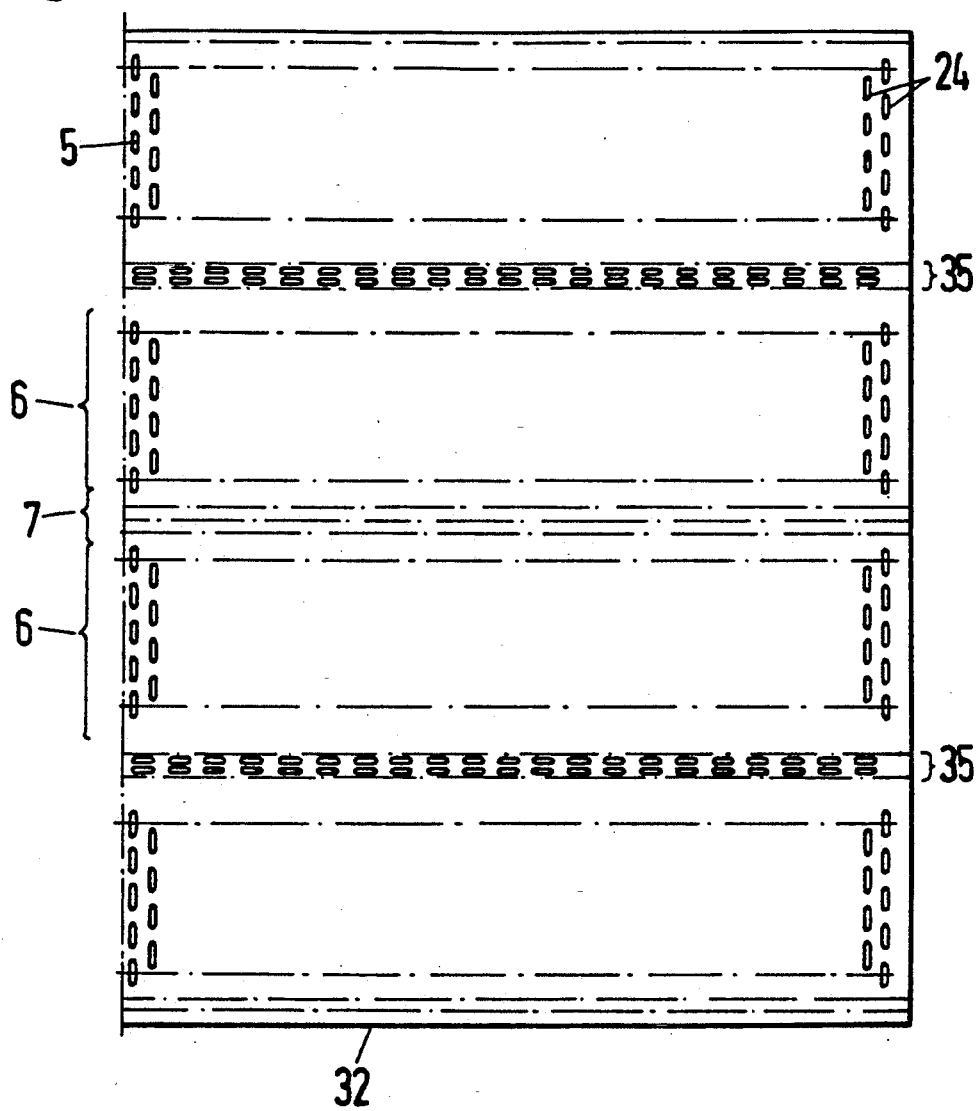

A further variant of a supporting grate is formed according to FIG. 7a from pairs of humped profiles 32. Their corrugation trough 8 consists of a separate collecting channel 33 attached to the bottom, whilst the perforated flat base 35 serves as a support, for example for a loose filling. An appropriate height for this collecting channel 33 can be chosen according to the diameter of a column and the quantity of fluid to be drawn off. The double profile 32 can be simply stamped out of sheet material, flanged and bent. The development thereof is shown in FIG. 7b. The gas openings 5 here are arranged so that they are offset individually (24).

Figure 8:
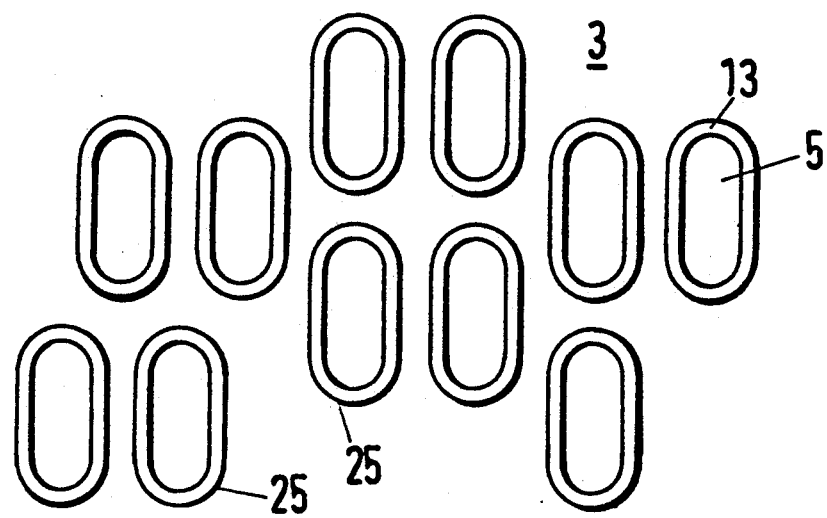
FIG. 8 shows an offset arrangement of gas openings.

FIG. 8 shows a further example with gas openings (25) offset in pairs. The bending up of the edges 13 of the openings has a strongly reinforcing effect on the flanks 6 of the corrugation profile, above all when the gas openings 5 are arranged offset. In this way with the same supporting capacity the profile height H is reduced, supports which waste space are avoided or with the same strength significantly more openings 5 are provided, which further increases the capacity of the column and reduces the pressure loss, or a thinner and more economical sheet material can also be used.

Figure 9:
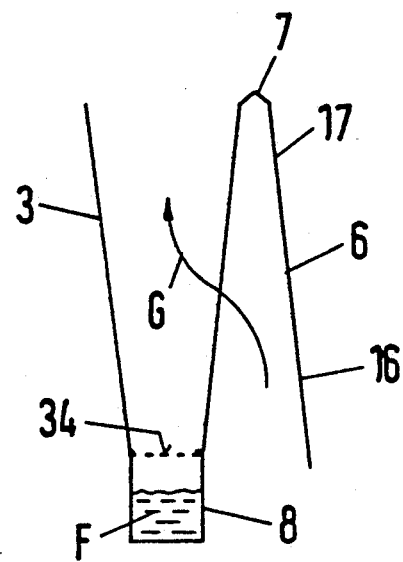
FIG. 9 shows a profile with additional covering over the bottom of the corrugation trough.

FIG. 9 shows a further example with corrugated profile 3 with an additional cover 34 over the bottom of the corrugation trough so that the supporting grate can be used in columns with loose fillers. This cover can be made for example from a metal grid or from metal mesh.

I claim:

1. Supporting grate for packings in material exchange columns comprising: a corrugated profile and gas openings, the gas openings being arranged in flanks of the profile and above a minimum height H1, the profile having closed domes, at least one drain hole or a lateral outlet in each corrugation through base of the profile above a collecting through which lies below it, the profile above a collecting through which lies below it, the profile having superimposed edges on the openings and being made of ceramic, and the gas openings having a projecting edge which is raised towards the fluid side.

2. Supporting grate as claimed in claim 1, wherein the ratio of the edge height to the diameter of the gas openings lies between 0.2 and 1.

3. Supporting grate as claimed in claim 1, wherein the ratio of the minimum height having no gas openings to the profile height lies between 0.2 and 0.5 and in that the trough base (8) forms the lowest part of the profile.

4. Supporting grate as claimed in claim 1, wherein the ratio of the free through-flow width between adjacent gas openings to the horizontal diameter thereof lies between 0.4 and 1.

5. Supporting grate as claimed in claim 1, wherein the free through-flow width is greater in the lower region of the profile flanks than in the upper region.

6. Supporting grate as claimed in claim 1, wherein the ratio of the width of the profile domes to the corrugation length of the profile lies between 0.1 and 0.3.

7. Supporting grate as claimed in claim 1, wherein the gas openings are arranged offset.

8. Supporting grate as claimed in claim 1, wherein an angle of the profile flanks is in a range of 5° to 15°.

9. Supporting grate as claimed in claim 1, wherein at least one collecting trough runs at right angles to the corrugation throughs and lies under the throughs.

10. Supporting grate as claimed in claim 1, further comprising an annular channel as a collecting trough on the column wall.

11. Supporting grate as claimed in claim 1, wherein the profile is assembled from parts.

* * * * *